(12) United States Patent
Miwa et al.

(10) Patent No.: US 7,543,962 B2
(45) Date of Patent: Jun. 9, 2009

(54) PROJECTION-TYPE IMAGE DISPLAY DEVICE

(75) Inventors: Takashi Miwa, Higashi-Osaka (JP); Kazuhiro Arai, Daito (JP); Yoshihiro Yokote, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/790,574

(22) Filed: Apr. 26, 2007

(65) Prior Publication Data

US 2007/0279938 A1  Dec. 6, 2007

(30) Foreign Application Priority Data

Apr. 27, 2006  (JP)  ............... P2006-124534
Apr. 25, 2007  (JP)  ............... P2007-115474

(51) Int. Cl.
*F21V 29/00* (2006.01)

(52) U.S. Cl. ............ 362/294; 362/362; 362/373; 362/613; 362/615; 353/87; 353/58; 353/52; 353/57

(58) Field of Classification Search ........... 362/294, 362/613, 615, 362, 373; 353/87, 58, 52, 353/57
See application file for complete search history.

(56) References Cited

U.S. PATENT DOCUMENTS

| 6,467,911 | B1 * | 10/2002 | Ueyama et al. | 353/87 |
| 7,159,987 | B2 * | 1/2007 | Sakata | 353/31 |
| 7,175,284 | B2 * | 2/2007 | Fuse et al. | 353/61 |
| 2004/0135874 | A1 * | 7/2004 | Oehlbeck et al. | 347/232 |
| 2006/0262514 | A1 * | 11/2006 | Conner et al. | 362/19 |

FOREIGN PATENT DOCUMENTS

JP  2001-222065  8/2001

* cited by examiner

*Primary Examiner*—Sandra L O'Shea
*Assistant Examiner*—Jessica L McMillan
(74) *Attorney, Agent, or Firm*—NDQ & M Watchstone LLP

(57) ABSTRACT

A projection-type image display device includes three light sources respectively configured to emit a different colored outgoing light, a light combining unit configured to combine outgoing lights, and a projection unit configured to project a combined light combined by the light combining it. The projection-type image display device includes a first cooler configured to cool a first light source of the three light sources, and a second cooler configured to cool a second and a third light source of the three light sources except the first light source.

7 Claims, 2 Drawing Sheets

PROJECTION-TYPE IMAGE DISPLAY DEVICE

CROSS REFERENCE TO RELATED APPLICATIONS

This application is based upon and claims the benefit of priority from prior Japanese Patent Application No. 2006-124534, filed on Apr. 27, 2006; and Japanese Patent Application No. 2007-115474, filed on Apr. 25, 2007; the entire contents of which are incorporated herein by reference.

BACKGROUND OF THE INVENTION

1. Field of the Invention

The present invention relates to a projection-type image display device including units for cooling light sources.

2. Description of the Related Art

A projection-type image display device uses a halogen lamp as a light source, and is configured to modulate lights emitted from the light source using a light valve such as a liquid crystal panel and configured to project the resultant light. Accordingly, a projection-type image display device needs to have a light source with high luminance. However, there has been a drawback that heat generated by the light source with high luminance causes a reduction in the luminescence property of the light source and a decrease in the lifetime thereof.

For this reason, conventionally, cooling air generated by a fan is blown to the light source to cool the light source, and then the air heated inside a housing of the device is A discharged to the outside of the housing (see Japanese Patent Application Laid-open Publication No. 2001-222065).

On the other hand, development has been pursued on a projection-type image display device using a solid-state light source such as an LED (light-emitting device) and an LD (laser diode) in place of a halogen lamp as a light source. In this type of projection-type image display device, the temperature range for allowing the solid-state light source to efficiently emit light is low. More specifically, the light-emitting operation must be performed at a temperature of about 100° C. or less. For this reason, this type of projection-type image display device requires stricter measures against the heat issues as mentioned above than the conventional lamp-type light source.

SUMMARY OF THE INVENTION

In an aspect of the present invention, a projection-type image display device includes three light sources respectively configured to emit an outgoing light of a different color, a light combining unit configured to combine the outgoing lights, and a projection unit configured to project a combined light combined by the light combining unit. The projection-type image display device includes a first cooler configured to cool a first light source of the three light sources, and a second cooler configured to cool a second light source and a third light source of the three light sources except the first light source.

According to the aforementioned aspect, it is possible to frilly cool the light source for each color such as an LED and a laser element.

In the aforementioned aspect of the present invention, it is preferable that the third light source has the smallest calorific value of the three light sources. In this aspect, the third light source having the smallest calorific value of at least three light sources and the second light source are cooled by the same second cooler and therefore it is possible to cool the light sources efficiently.

In the aforementioned aspect of the present invention, the projection-type image display device further includes: a first optical path configured to guide a first outgoing light emitted from the first light source to the light combining unit; a second optical path configured to guide a second outgoing light emitted from the second light source to the light combining unit; and a third optical path configured to guide a third outgoing light emitted from the third light source to the light combining unit. In addition, it is preferable that the second optical path has a curve portion configured to fold the second outgoing light. According to the aforementioned aspect, the provision of the curve portion in the second optical path makes it possible to arrange the second and the third light source dose to each other and miniaturize the second cooler that cools the second and the third light source. Therefore, according to this projection-type image display device, it is possible to achieve miniaturization, reduction in weight, and reduction in the cost of the projection-type image display device.

In the aforementioned aspect of the present invention, it is preferable that each optical path has an integrator configured to uniformize an illumination distribution of the outgoing light emitted from respective light source. According to the aforementioned aspect, the provision of the integrator such as the rod integrator in the optical path makes it possible to provide a projection-type image display device that is capable of displaying a beautiful image with less irregularity in luminance or color. Moreover, the use of a reflector such as a triangular prism in the curve portion makes it possible to achieve an optical path with the curve portion in a simple structure.

In the aforementioned aspect of the present invention, it is preferable that respective cooler is a liquid cooler circulating a liquid coolant. Furthermore, it is preferable that respective cooler includes a Peltier device. Specifically, the cooler is a liquid cooler having a heat conduction unit, a radiator, and a coolant pipe. The heat conduction unit absorbs heat from the light source and conducts the resultant to the coolant. The radiator cools the coolant and radiates the resultant to the outside of the projection-type image display device. Then, the coolant pipe connects the heat conduction unit to the radiator in such a way to circulate the liquid coolant such as cooling water or oil, thereby making it possible to improve cooling ability of the cooler. Particularly, a heat transferable member such as a Peltier device is provided in the vicinity of the light source, thereby allowing heat to be forcibly absorbed from the light source, which makes it possible to cool the light source in a short period of time.

In the aforementioned aspect of the present invention, it is preferable that respective cooler includes a laser element. The use of a laser element as the light source for the projection-type image display device is useful from the viewpoint of laser properties (coherence level and luminous efficiency). On the other hand, there is a problem of a change in luminescence properties, which is called a rollover, due to environmental temperature, specifically, a reduction of the luminescence properties with an increase of the environmental temperature. Accordingly, the provision of the cooler as in the present invention allows the projection-type image display device to be operated efficiently.

Incidentally, the second light source is a green light source. Moreover, a light valve that modulates light on the basis of an image signal to generate an image light, for example, a transparent liquid crystal panel may be placed between the integrator and the light combining unit or between the light combining unit and the projection unit.

BRIEF DESCRIPTION OF TEE DRAWINGS

FIG. 3B is a front view seen in a direction x thereof.

DETAILED DESCRIPTION OF THE PREFERRED EMBODIMENT

Hereinafter, explanation will be given for a projection-type image display device of the present invention.

Figure 1:
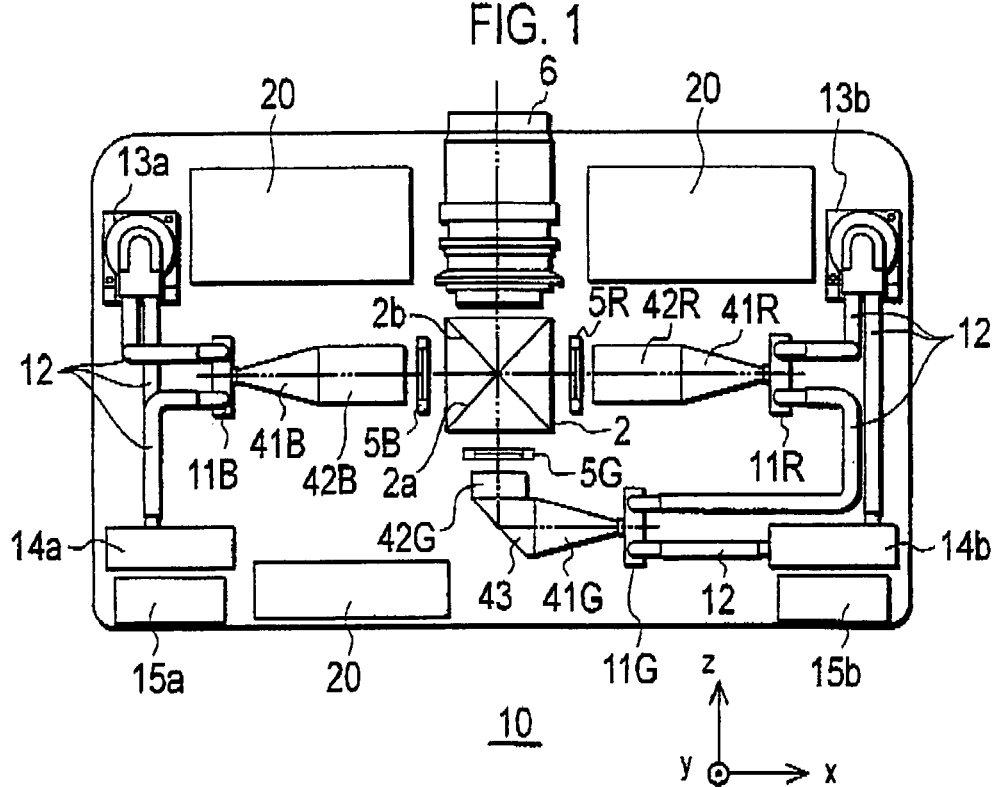
FIG. 1 is a plan view of a projection-type image display device 10.
Figure 2:
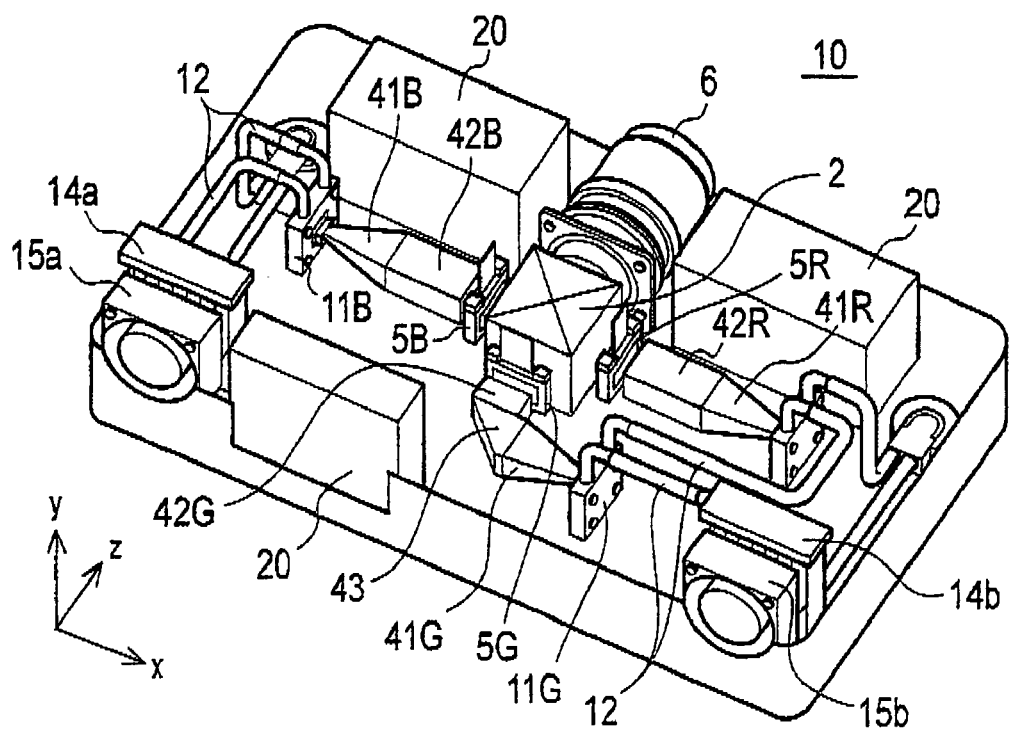
FIG. 2 is a perspective view of a projection-type image display device 10.

FIGS. 1 and 2 are views each illustrating the structure of a projection-type image display device 10. FIG. 1 is a plan view and FIG. 2 is a perspective view. The projection-type image display device 10 includes, in its housing, a plurality of light sources 11 (11R 11G, 11B), a plurality of first rod integrators 41 (41R, 41G, 41B), a plurality of second rod integrators 42 (42R, 42G, 421), a triangular prism 43, a plurality of liquid crystal panels 5 (5R, 50, 5B), a dichroic prism 2, a projection lens 6, pipes 12, a plurality of radiators 14 (14a, 14b), and a plurality of blower fans 15 (15a, 15b). Moreover, in the same figure, reference numeral 20 indicates an electrical circuit 20.

(Explanation of Optical System of Projection-Type Image Display Device 10)

An optical system of the projection-type image display device 10 will be first explained. The light source 11 is composed of light sources 11R, 11G, 113, which have a red LED element 61R that emits a red light, a green LED element 61G that emits a green light and a blue LED light source 61B that emits a blue light, respectively. The structure of the light source 11 will be specifically explained later with reference to FIG. 3A and FIG. 3B. Each first rod integrator 41 is made of lass or resin such as acryl and has a taper shape with a light outgoing surface larger than the light incident surface. An incident light to the first rod integrator 41 is repeatedly reflected by the side surfaces, whereby its divergence angle is reduced. Each second rod integrator 42 is made of glass or resin such as acryl and has a prismatic shape with a light outgoing surface equal (or substantially equal) in Side to a light incident surface. An incident light to the second rod integrator 42 is repeatedly reflected by the side surfaces, whereby an uniform surface light is formed, and the light surface light is emitted to the liquid crystal panel 5. Additionally, in an optical path from the light source 11G, there is provided the triangular prism 43 that folds the traveling direction of an outgoing light emitted from the first rod integrator 41 by 90 degrees to guide the light to the second rod integrator 42G.

The liquid crystal panel 5 modulates an incident light on the basis of a driving signal outputted from an image signal generation circuit (not illustrated), and emits the light as an image light. Outgoing lights from the liquid crystal panels 5 (5R, 5G, 5B) are combined by a cross chronic prism 2 to be emitted to the projection lens 6. The projection lens 6 enlarges and projects the incident light on a screen (not illustrated). It should be noted that the cross dichroic prism 2 has a property that the prism reflects a red light and a blue light entering from the light incident surface and that passes through a green light entering from the light incident surface. Accordingly, the green light is set to enter the cross dichroic prism 2 from the light incident surface opposite to the light outgoing surface (on the projection lens 6 side). Moreover, the divergence angle of the light entering the projection lens 6 required to be made sufficiently small (for example, 15 degrees or less). Namely, in order to make the divergence angle sufficiently small it is necessary to use a sufficiently long taper-shaped first rod integrator 41.

(Explanation of Cooling System of Projection-Type Image Display Device 10)

A cooling system of the light source 11 of the projection-type image display device 10 will be next explained. With reference to FIG. 1 (and FIG. 2), the cooling system is divided into a first cooling system that cools the light source 11B and a second cooling system that cools the light sources 11G and 2011R.

Figure 3A:
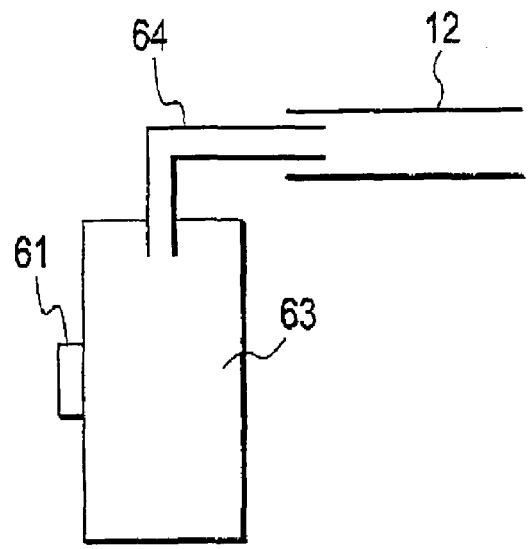
FIG. 3A and FIG. 3B are a view illustrating a structure of a light source 11. The FIG. 3A is a front view seen in a direction z of FIG. 1.
Figure 3A:
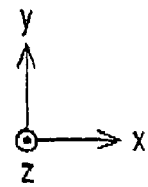
Figure 3B:
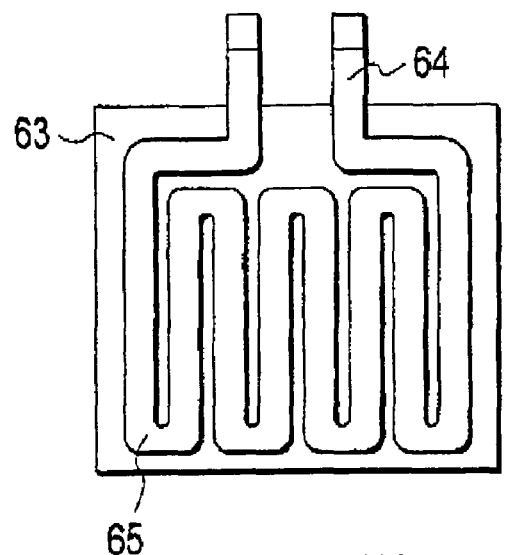
Figure 3B:
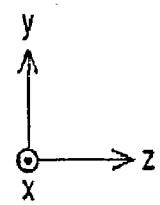

An explanation will be first given on the structure of the light source 11 with reference to FIG. 3A and FIG. 3B. The light source 11 includes an LED element 61, a heat conduction unit 63, a pipe coupling unit 64, and a coolant passage 65. FIG. 3A is a view seeing the light source 11 (light source 110 in FIG. 1) from the front (minus z direction in FIG. 1), and FIG. 3B is a view seeing the light source 11 (11G) from the side (minus x direction in FIG. 1). It should be noted that arrows indicating directions x, y, and z in this figure correspond to directions indicated by arrows in FIGS. 1 and 2, respectively.

The heat conduction unit 63 is made of metal having a high thermal conductivity such as copper. Moreover, as illustrated in FIG. 3B, the coolant passage 65 is formed in the heat conduction unit 63. Heat generated by the LED is thermally conducted to the coolant (water in this embodiment) flowing in the coolant passage 65 via the heat conduction unit 63. Then, the coolant flows into the pipe 12 through an outlet side of the pipe coupling unit 64. Thus, the light source 11 is cooled by the coolant.

An explanation will be given on the other structural elements of the cooling systems that cool the light source 11 with reference to FIG. 1 (and Fig. M).

First, the first cooling system will be explained. The coolant from the light source 11B is directed to a radiation fin radiator) 14a through the pipe 12. The pipe 12 is a pipe made of resin (for example, a rubber hose) or metal The radiation fin 14a cools the coolant heated by the light source 11B. The cooled coolant is directed to a pump 13a. The pump 13a has a function of circulating the coolant of the first cooling system. The coolant is directed to the light source 11B through the pump 13a. A blower fan 15a is provided at the back surface of the radiation fin 14a (a surface different from the surface where coolant inlet/outlet ports are formed). The blower fin 15a inhales the air in the housing and discharges the air to the outside area. Heat is efficiently absorbed from the coolant liquid in the radiation fin 14a by the discharged air, and then the heat is exhausted to the outside of the housing.

Next, the second cooling system will be explained. The coolant from the light source 11G is directed to the light source 11G through the pipe 12. As in the case of the first cooling system, the pipe 12 is a pipe made of resin (for example, rubber hose) or metal. The coolant from the light source 11G is directed to a radiation fin (radiator) 14b through the pipe 12. The radiation fin 14b cools the coolant heated by the light sources 11R and 11G. The cooled coolant is directed to a pump 13b. The pump 13b has a function of circulating the coolant of the second cooling system. The coolant is directed to the light source 11R through the pump 13b. A blower fan a b is provided at the back of the radiation fin 14b (surface different from the surface where coolant inlet/outlet ports are formed). The blower fan 15b inhales air in the housing and discharges air to the outside area. Heat is efficiently absorbed from the coolant liquid in the radiation fin 14b by the discharged air and heat is exhausted to the outside of the housing.

In addition, the layout position of the pump 13 is not limited to the aforementioned structure, for example, the pump 13 may be positioned between the light source 11R and the light source 11G. Or, the coolant may be circulated in a direction reverse to that of the aforementioned embodiment. For example, the coolant from the light source 11B may be directed to the radiation fin 14a through the pipe 12 from the pump 13a. However, note that it is preferable that the coolant from the light source 11 be directed to the pump 13 through the radiation fin 14 in view of the point that the pump 13 does not get heated.

Furthermore, in the optical path for the green light, the second rod integrator 42G is provided between the triangular prism 43 and the liquid crystal panel 5, however, a structure may be employed in which the second rod integrator 42G is omitted. Alternatively, an optical member may be employed in which the triangular prism 43 and the second rod integrator 42G are unified.

(Function)

In this embodiment, the light source 11R has a minimum calorific value, the light source 11B has a maximum calorific value, and the light source 11G has an intermediate value therebetween. For this, the cooling system of the light source 11B is separated from the cooling system of the light sources 11G, 11R, thereby allowing the light sources 11G and 11R to be sufficiently cooled. In contrast to this, when the cooling systems are not separated, the coolant is heated by the heat of the light source 11B, so that the other light sources (11G, 11R) cannot be fully cooled.

Additionally, in the optical path from the light source 11G, provided is the triangular prism 43 that folds the optical path at 90 degrees. By providing the triangular prism 43 which folds the optical path, it is possible to reduce the space needed for the projection-type image display device 10 using the aforementioned first rod integrator 41. In addition, the triangular prism 43 is positioned so that the light incident surface is positioned on the light source 11R side (and not the light source 11B side). This configuration aims to arrange the light sources 11G and 11R close to each other. If the light sources 11G and 11R are arranged close to each other, it is possible to shorten the length of the pipe of the second cooling system, and also to eliminate the necessity to use a pump with high output capability.

In contrast, if such a folded shape is not employed, the distance between the light sources is increased. As a result, the length of the pipe is increased when a plurality of light sources are required to be cooled by a single cooling system. This configuration increases the weight of the device, and also needs a pump with high output capability.

It should be understood that the embodiment described above is an example for explaining the present invention in view of all points and should not be taken as limiting the scope of the present invention. The scope of the invention is indicated by the appended claims rather than the foregoing description, and all modifications that come within the meaning and range of equivalence thereof are intended to be embraced therein.

In this embodiment, the first cooling system that cools the blue light source is separated from the second cooling system that cools the other color light sources. However, it is not the feature of the present invention to merely separate blue from green and red, but to share the task of cooling the three light sources by the two coolers. In consideration of the characteristic of the light source to be used, the cooling system of a light source other than the blue one may be separated from the cooling system of other color light sources. For example, the cooling system may alternatively be configured of the first cooling system that cools the light source having the second largest calorific value; and the second cooling system that cools the light sources for other colors having the first and third largest calorific values.

It should be noted that the calorific value of the light source mentioned above indicates a calorific value associated with an output from the light source necessary for displaying a predetermined image light. The measurement of calorific value is performed by measuring temperature of a light source peripheral part; for example.

Although the light source cooling systems of this embodiment performs cooling by the coolant, cooling may be performed without using the coolant. For example, the red light source and the green light source are arranged close to each other and these light sources may be cooled by a common cooling member having a high thermal conductivity (for example, a metal-plate radiation member). Moreover, although the aforementioned embodiment relates to a three-panel projection-type image display device having three liquid crystal panels, the present invention may be applied to a single-panel projection-type image display device. In this case, a liquid crystal panel is placed at a position receiving lights with colors combined by the cross dichroic prism 2.

In this embodiment, the light from the light source having the largest calorific value is set to enter from the light incident surface not opposed to the light outgoing surface of the cross dichroic prism 2. However, in place of this, the light from the light source having the largest calorific value may be set to enter from the light incident surface opposed to the light outgoing surface of the cross dichroic prism 2. At this time, the integrator, which guides the light to the light incident surface of the cross dichroic prism 2, is folded to the light source side having the smallest calorific value. For example, in the projection-type image display device 10 as illustrated in FIG. 1, when the green LED light source has the maximum calorific value, the red LED light source has the second largest calorific value, and the blue LED light source has the minimum calorific value, the integrator for the green LED light source may be folded to the blue LED light source side.

Although explanation has been given with regard to the LED as the light source in the aforementioned embodiment, the ht source requiring strict measures against heat as compared with the conventional lamp-type light source is not limited to the LED light source. Besides the LED light source, the present invention can be used for light sources such as an LD light source and a light source molded with resin. In the LD light source, luminous efficiency may decline due to a so-called rollover phenomenon caused by environmental temperature. Meanwhile, in the light source molded with resin, the resin may be yellowed by the environmental temperature. Furthermore, the light source is not always formed of a single luminous element, and in some cases, a light source is structured by arraying a plurality of luminous elements, in which case the total heat value generated by the plurality of luminous elements must be considered.

Although the heat conduction unit has been explained using a copper plate having a high thermal conductivity, a heat transferable member such as a Peltier device may be provided in the heat conduction unit in order to improve responsibility of the cooling system (improve cooling ability), thereby making it possible to absorb beat generated by the light source in a shorter period of time.

What is claimed is:

1. A projection-type image display device including three light sources respectively configured to emit an outgoing light of a different color, a light combining unit configured to combine the outgoing lights, and a projection unit configured to project a combined light combined by the light combining unit, comprising:

a first cooler configured to cool a first light source of the three light sources; and a second cooler configured to cool a second and a third light source of the three light sources except the first light source.

2. The projection-type image display device according to claim 1, wherein, the third light source has the smallest calorific value among the three light sources.

3. The projection-type image display device according to claim 1, further comprising:

a first optical path configured to guide a first outgoing light emitted from the first light source to the light combining unit;

a second optical path configured to guide a second outgoing light emitted from the second light source to the light combining unit; and a third optical path configured to guide a third outgoing light emitted from the third light source to the light combining unit, wherein, the second optical path has a curve portion configured to fold the second outgoing light.

4. The projection-type image display device according to claim 3, wherein, respective optical path includes an integrator configured to uniformize an illumination distribution of the outgoing light emitted from respective light source.

5. The projection-type image display device according to claim 1, wherein, respective cooler is a liquid cooler in which a liquid coolant is circulated.

6. The projection-type image display device according to claim 1, wherein, respective cooler includes a Peltier device.

7. The projection-type image display device according to claim 1, wherein, respective light source includes a laser element.

* * * * *